US012316060B2

(12) United States Patent
Chen

(10) Patent No.: US 12,316,060 B2
(45) Date of Patent: May 27, 2025

(54) CONNECTING TERMINAL

(71) Applicant: XIAMEN GHGM INDUSTRIAL TRADE CO., LTD, Xiamen (CN)

(72) Inventor: Bingshui Chen, Xiamen (CN)

(73) Assignee: XIAMEN GHGM INDUSTRIAL TRADE CO., LTD, Xiamen (CN)

( * ) Notice: Subject to any disclaimer, the term of this patent is extended or adjusted under 35 U.S.C. 154(b) by 366 days.

(21) Appl. No.: 17/993,985

(22) Filed: Nov. 24, 2022

(65) Prior Publication Data

US 2024/0039176 A1 Feb. 1, 2024

(30) Foreign Application Priority Data

Jul. 29, 2022 (CN) ......................... 202210906192.7

(51) Int. Cl.
*H01R 4/48* (2006.01)
*H01R 13/506* (2006.01)
*H01R 13/52* (2006.01)

(52) U.S. Cl.
CPC ............. *H01R 4/48* (2013.01); *H01R 13/506* (2013.01); *H01R 13/5213* (2013.01)

(58) Field of Classification Search
CPC .... H01R 4/48; H01R 13/506; H01R 13/5213; H01R 11/09; H01R 4/484; H01R 4/4821; H01R 4/483
See application file for complete search history.

(56) References Cited

FOREIGN PATENT DOCUMENTS

CN 112310668 A * 2/2021
CN 213584390 U * 6/2021 ........... H01R 4/4836

* cited by examiner

*Primary Examiner* — Tho D Ta

(57) ABSTRACT

A connecting terminal, related to a technical field of electronic connectors, includes a plastic housing and elastic clamping mechanisms. The elastic clamping mechanisms are disposed on the plastic housing. The plastic housing includes a base body and a cover body. The base body penetrates out of the cover body after being matched with the cover body in up-and-down plug-in connection and at least partially exposed on the cover body, and the base body is matched with the cover body to form inner spaces for the elastic clamping mechanisms. Wire insertion holes are oppositely defined on two opposite sides of the cover body in a length direction of the cover body. The wire insertion holes are respectively configured to insert external electrical conductors into the inner spaces to be in contact with the elastic clamping mechanisms, so as to electrically connect at least two of the external electrical conductors.

10 Claims, 7 Drawing Sheets

CONNECTING TERMINAL

TECHNICAL FIELD

The present disclosure relates to a technical field of electronic connectors, and in particular to a connecting terminal.

BACKGROUND

Nowadays, clip-type electronic connectors are widely used in various electricity usage scenarios for effectively clamping electrical conductors. Commercially available connectors, being in a plug-in type, include insertion ports for inserting the electrical conductors, where the insertion ports are disposed on two sides of a housing, so as to respectively provide plug-in connection for the electrical conductors on different sides. The commercially available connectors are typically formed by two separate housing components and one connecting component, each of the two separate housing components forms half of the connectors, and the two separate housing components together form an entire connector, which means that the two separate housing components are required to be mated together.

For example, Chinese patent, having an application number of CN 201580062470.3 discloses a connecting terminal and an installation method thereof, disassembly and assembly of which are achieved through connection between the housing components on both sides and the connecting component in the middle, and the housing components and the connecting component are assembled to form an entire housing structure. Even, in order to improve stability of the connection, different components are snap-connected. However, such installation method is complex in structure and is inconvenient for operating, which invisibly increases manufacturing and use costs. What's more, many limitations, such as poor connectivity among separate components, are correspondingly caused, and especially the connecting terminal is easy to break away when using, which greatly affects production and operation.

SUMMARY

Based on above, the present disclosure aims to provide a connecting terminal for solving corresponding technical problem.

The present disclosure adopts technical solutions as followings.

The present disclosure provides a connecting terminal, including a plastic housing and elastic clamping mechanisms. The elastic clamping mechanisms are disposed on the plastic housing. The plastic housing includes a base body and a cover body. The base body penetrates out of the cover body after being matched with the cover body in up-and-down plug-in connection and at least partially exposed on the cover body, and the base body is matched with the cover body to form inner spaces for the elastic clamping mechanisms. Wire insertion holes are oppositely defined on two opposite sides of the cover body in a length direction of the cover body. The wire insertion holes are respectively configured to insert external electrical conductors into the inner spaces to be in contact with the elastic clamping mechanisms, so as to electrically connect at least two of the external electrical conductors.

Furthermore, the base body is configured as a boss structure, where the boss structure is low in both sides and high in a middle. The cover body is configured as a box-shaped structure having a through opening, and the through opening is configured to match the boss structure with the box-shaped structure in the up-and-down plug-in connection.

Furthermore, the through opening is centrally defined on the cover body along an up-and-down direction. After the base body is matched with the cover body and partially penetrates through the cover body, a top of the boss structure is flush with a top of the box-shaped structure, a bottom of the boss structure is flush with a bottom of the box-shaped structure, so as to integrally form the boss structure and the box-shaped structure from an appearance.

Furthermore, a plurality of the wire insertion holes is defined along a width direction of the cover body, an outer wall segment is disposed on the cover body with respect to each of the plurality of the wire insertion holes, and each of wire insertion spaces is defined between adjacent two of the plurality of the wire insertion holes through dividing portions, where the dividing portions are disposed on the cover body.

Furthermore, the outer wall segment transversely extends from the through opening, along a respective one of the wire insertion holes, to form a free end portion for covering above the base body. Each of the dividing portions longitudinally extends along the length direction of the cover body, the dividing portions divide the through opening into a plurality of opening portions, and the plurality of the opening portions is separated. Insertion grooves are defined on the base body. The insertions grooves are matched with the dividing portions, and the outer wall segment and each of the dividing portions are disposed at intervals.

Furthermore, protrusions, capable of being respectively accommodated in the plurality of the opening portions, are disposed on the base body, and gaps, communicated with the insertion grooves, are oppositely disposed between the protrusions at intervals.

Furthermore, groove walls of each of the insertion grooves extend upwards from an end surface of the base body to form a first creepage distance. An upper end of each of the dividing portions extends upwards to form protruding blocks, and an upper end of each of the protrusions extends upward to form a flange, so as to cooperate to form a second creepage distance. A protruding height of the protruding blocks is equal to a protruding height of the flange.

Furthermore, the connecting terminal further includes operating members. The operating members are rotatably disposed on the cover body for respectively opening clamping structures of the elastic clamping mechanisms to supply external electrical conductor clamping operation. Each of the elastic clamping mechanisms includes spring clips and a busbar. The busbar is disposed on the base body, the spring clips are disposed in a respective one of the inner spaces between the base body and the cover body, and the spring clips and the busbar cooperate to form a respective one of the clamping structures for clamping. The busbar is disposed in the respective one of the inner spaces, the busbar is detachably and transversely disposed in a middle of the base body and extends to be exposed outside, two ends of the busbar respectively extend to be in contact with the spring clips, and the spring clips are disposed in each of the wire insertion spaces between opposite two of the wire insertion holes.

Furthermore, retaining walls are disposed on the base body, each of the retaining walls is configured to divide the respective one of the inner spaces into separate two of the wire insertion spaces. A first assembly space for inserting the busbar is defined above each of the retaining walls. A lower portion of each of the retaining walls is integrally disposed on the end surface of the base body. Clamping portions are disposed on one side of the end surface of the base body, where the one side of the end surface of the base body is connected to each of the retaining walls. Abutting portions, with respect to the clamping portions, are disposed on an inner side of the cover body. Each of the clamping portions and each of the abutting portions together define a second assembly space for the spring clips.

Furthermore, a plurality of snap-fit structures is disposed along an outer peripheral side of the base body, butt joint structures are disposed on an inner side of the cover body with respect to the plurality of the snap-fit structures. The butt joint structures are snap-fitted with the plurality of the snap-fit structures.

Through adopting the technical solutions, the present disclosure achieves following technical effects.

The present disclosure provides the connecting terminal, which is assembled to form an outer housing structure through matching the base body at bottom with the cover body at top in the up-and-down plug-in connection, and each structural member of the connecting terminal is more reasonably configured, which further saves space and cost. In particular, the base body penetrates out of the cover body and is at least partially exposed on the cover body, so that the cover body and the base body are tightly matched and integrated into a whole. In addition, a direction where the external electrical conductor is inserted into the inner spaces through an assembly method of the up-and-down plug-in connection of an outer housing of the present disclosure is perpendicular to a lateral direction where the external electrical conductor is inserted into the inner spaces through the wire insertion holes disposed at sides, which greatly avoids influence of a plugging process on the assembly method of the outer housing, thereby achieving purposes of more stable installation, labor-saving operating, cost saving, etc., efficiency in both production manufacture and operation and use is significantly improved, and competitiveness of products related to the present disclosure is further greatly improved.

Figure 1:
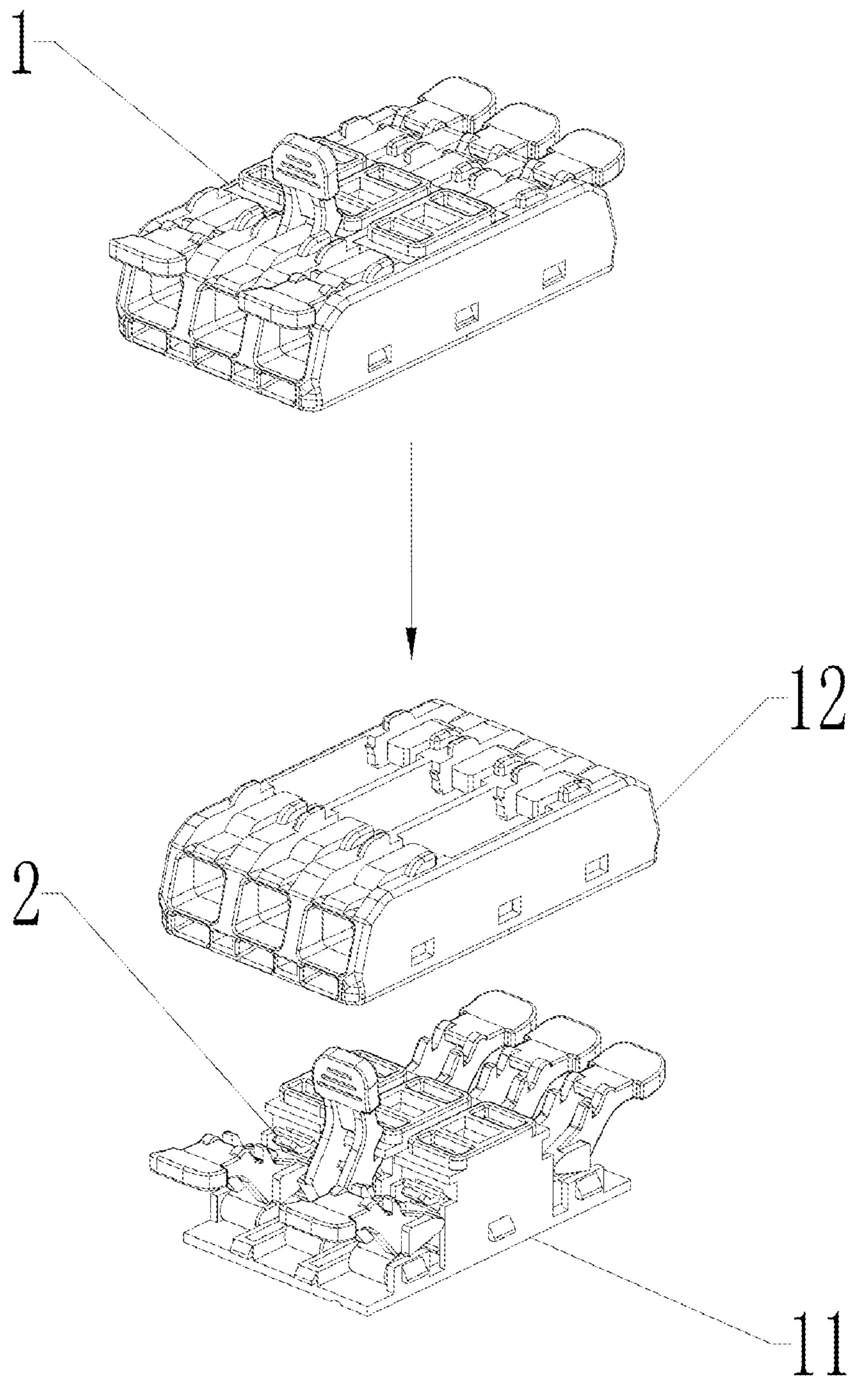
FIG. 1 is a structural schematic diagram of a connecting terminal according to one embodiment of the present disclosure, where the following diagram is a partially exploded view of the upper diagram.

Reference number in drawings: 1. plastic housing; 11. base body; 111. insertion groove; 112. protruding portion; 113. gap; 114. retaining wall; 115. clamping portion; 116. snap-fit structure; 117. flange; 12. cover body; 121. wire insertion hole; 122. through opening; 123. outer wall segment; 124. dividing portion; 125. protruding block; 126. abutting portion; 13. detection port; 2. elastic clamping mechanism; 21. spring clip; 22. busbar; and 3. operating member.

DETAILED DESCRIPTION

To make the objectives, technical solutions, and advantages of embodiments of the present disclosure clearer, the following clearly and completely describes the technical solutions in the embodiments of the present disclosure with reference to the accompanying drawings in the embodiments of the present disclosure. Apparently, the described embodiments are a part rather than all of the embodiments of the present disclosure.

EMBODIMENTS

As shown in FIGS. 1-9, the embodiments provide a connecting terminal, including a plastic housing 1 and elastic clamping mechanisms 2. The elastic clamping mechanisms 2 are disposed on the plastic housing 1. The plastic housing 1 includes a base body 11 and a cover body 12. The base body 11 penetrates out of the cover body 12 after being matched with the cover body 12 in up-and-down plug-in connection and at least partially exposed on the cover body 12, and the base body 11 is matched with the cover body 12 to form inner spaces for the elastic clamping mechanisms 2. Wire insertion holes 121 are oppositely defined on two opposite sides of the cover body 12 in a length direction of the cover body 12. The wire insertion holes 121 are respectively configured to insert external electrical conductors into the inner spaces to be in contact with the elastic clamping mechanisms 2, so as to electrically connect at least two of the external electrical conductors.

The present disclosure provides the connecting terminal, which is assembled to form an outer housing structure through matching the base body 11 at bottom with the cover body 12 at top in the up-and-down plug-in connection, and each structural member of the connecting terminal is more reasonably configured, which further saves space and cost. In particular, the base body 11 penetrates out of the cover body 12 and is at least partially exposed on the cover body 12, so that the cover body 12 and the base body 11 are tightly matched and integrated into a whole. In addition, a direction where the external electrical conductor is inserted into the inner spaces through an assembly method of the up-and-down plug-in connection of an outer housing of the present disclosure is perpendicular to a lateral direction where the external electrical conductor is inserted into the inner spaces through the wire insertion holes 121 disposed at sides, which greatly avoids influence of a plugging process on the assembly method of the outer housing, thereby achieving purposes of more stable installation, labor-saving operating, cost saving, etc., efficiency in both production manufacture and operation and use is significantly improved, and competitiveness of products related to the present disclosure is further greatly improved.

Figure 2:
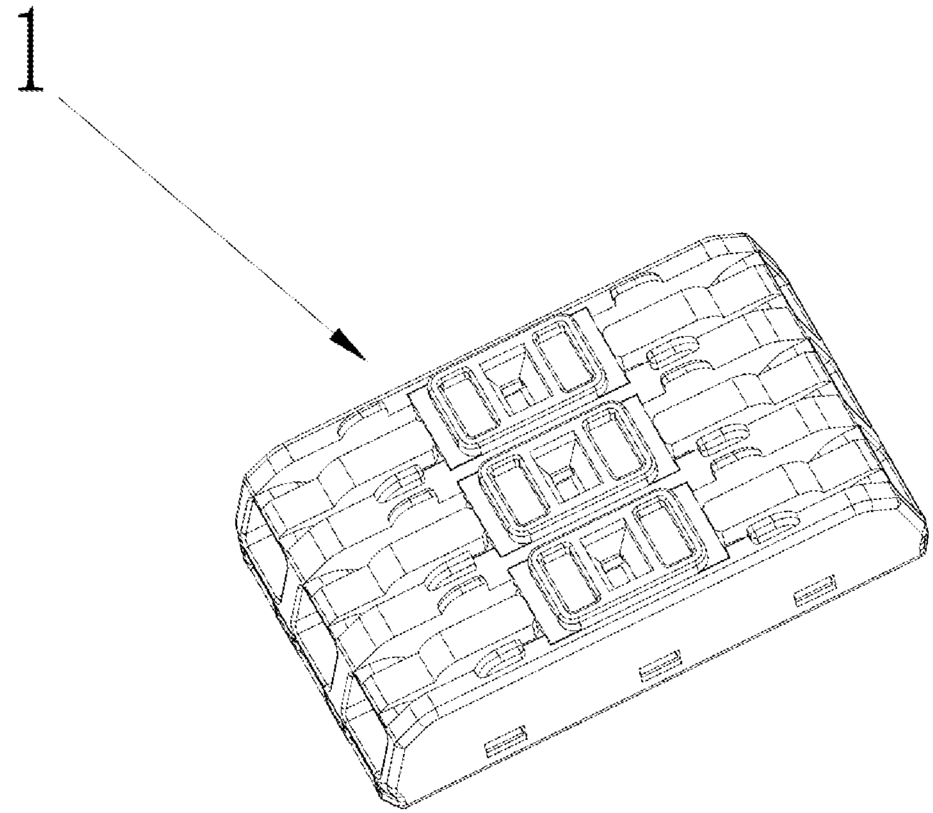
FIG. 2 is a structural schematic diagram of a plastic housing of the connecting terminal according to one embodiment of the present disclosure.
Figure 3:
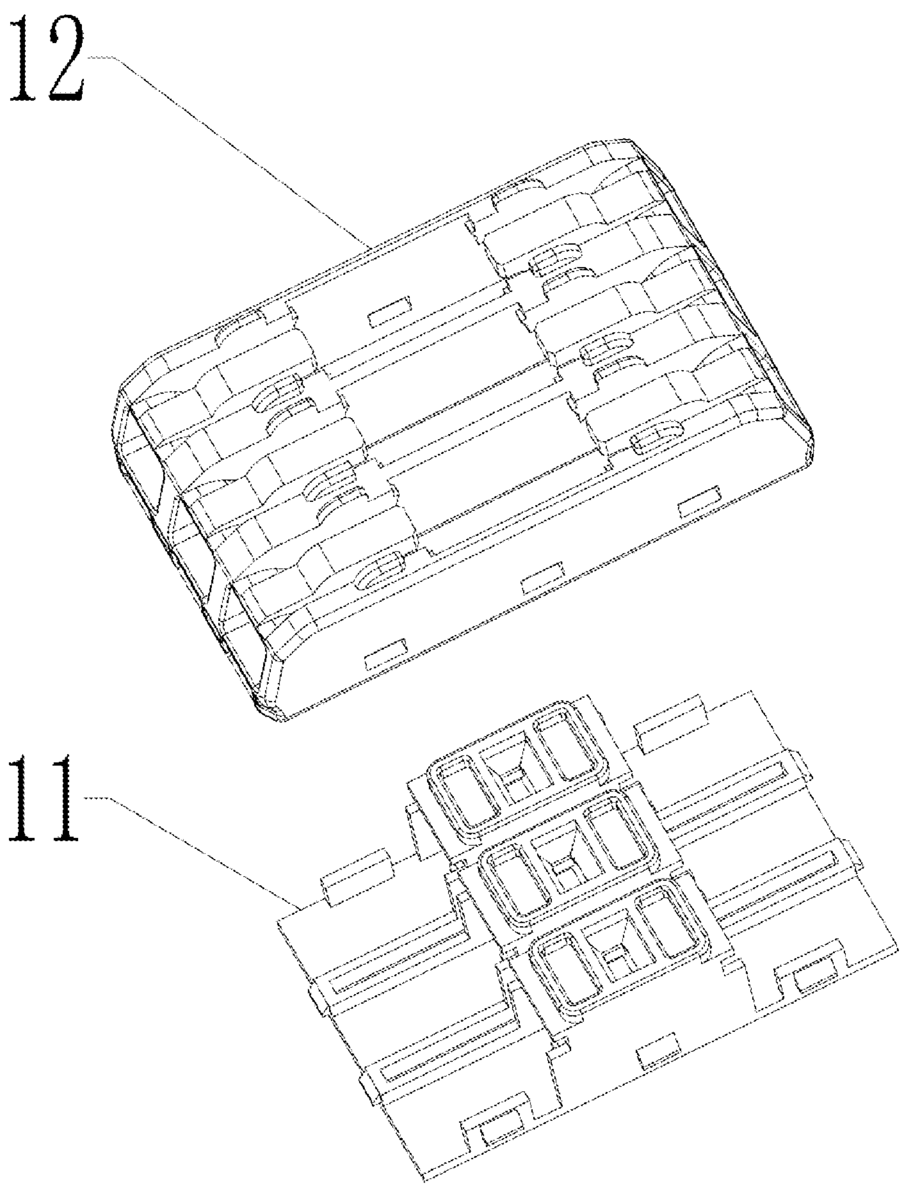
FIG. 3 is a schematic diagram of an exploded view of the plastic housing shown in FIG. 2.
Figure 4:
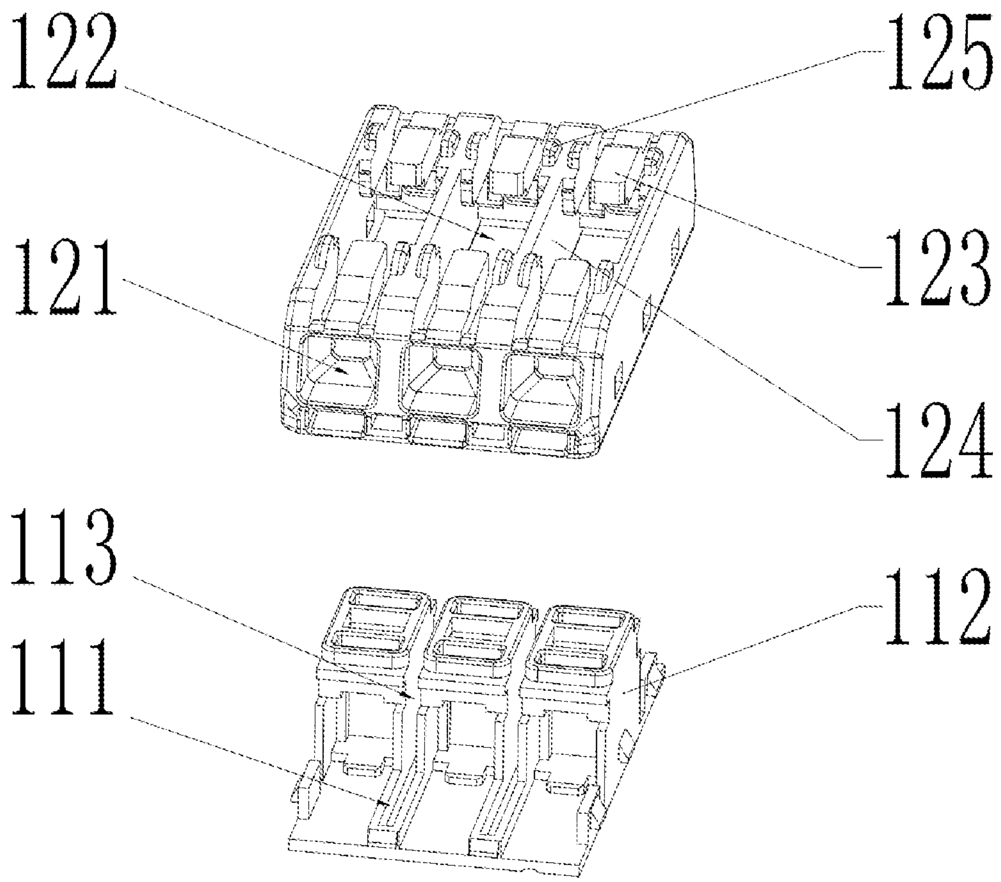
FIG. 4 is a structural schematic diagram of FIG. 3 at another viewing angle.

As shown in FIGS. 2-4, in the embodiment, the base body 11 is configured as a boss structure, where the boss structure is low in both sides and high in a middle. The cover body 12 is configured as a box-shaped structure having a through opening 122, and the through opening 122 is configured to match the boss structure with the box-shaped structure in the up-and-down plug-in connection. In particular, bottom surfaces extend from two ends of the base body 11 along a length direction of the base body 11 to match with a bottom of the cover body 12 and further clamp with the bottom of the cover body 12, so as to enclose the inner spaces after assembling the base body 11 and the cover body 12 for conveniently assembling and disassembling the elastic clamping mechanisms 2. In addition, the base body 11 form convex surfaces in the middle, and the convex surfaces penetrate through the through opening to expose on the cover body 12.

Furthermore, the through opening 122 is centrally defined on the cover body 12 along an up-and-down direction. After the base body 11 is matched with the cover body 12 and partially penetrates through the cover body 12, a top of the boss structure is flush with a top of the box-shaped structure, a bottom of the boss structure is flush with a bottom of the box-shaped structure, so as to integrally form the boss structure and the box-shaped structure from an appearance. Apparently, the cover body 12, having the box-shaped structure, defines a space suitable for abutting and covering the boss structure at the bottom of the cover body 12, and the through opening 122 allows the boss structure to enter and exit the cover body 12. In particular, the tops and the bottoms of the base body 11 and the cover body 12 are respectively and smoothly docked at respective end face positions, which ensures consistency and stability of the plastic housing 1 after assembly, and greatly improves recognition degree of the products related to the present disclosure.

Figure 5:
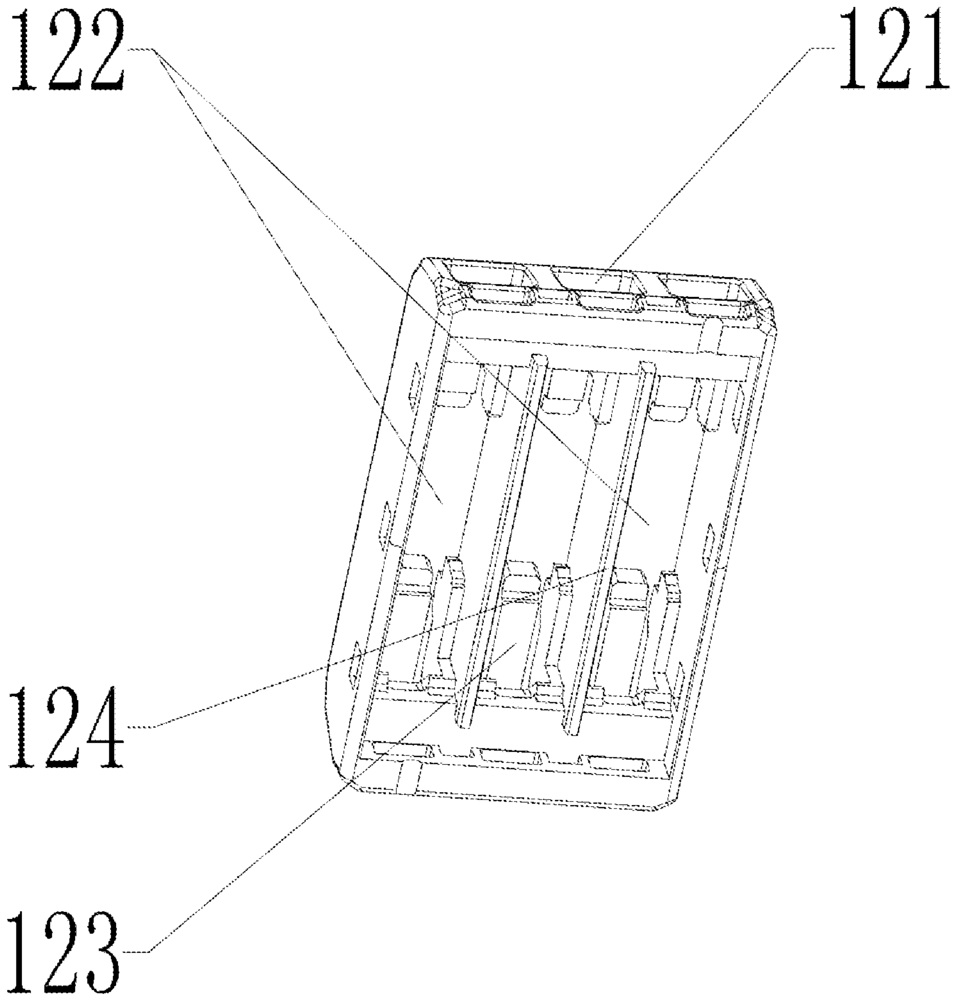
FIG. 5 is a structural schematic diagram of a cover body of the connecting terminal according to one embodiment of the present disclosure.
Figure 6:
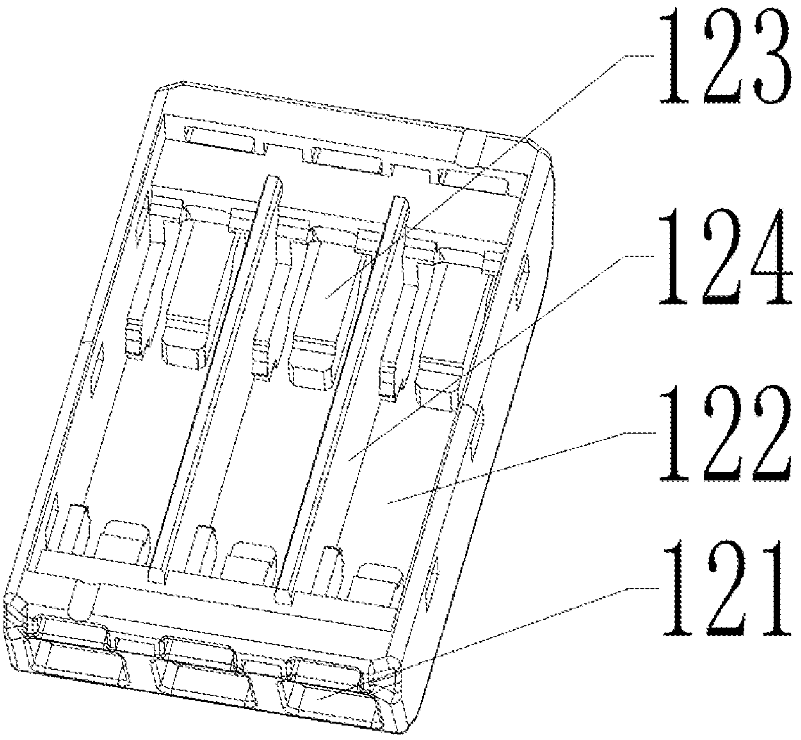
FIG. 6 is a structural schematic diagram of FIG. 5 at another viewing angle.
Figure 7:
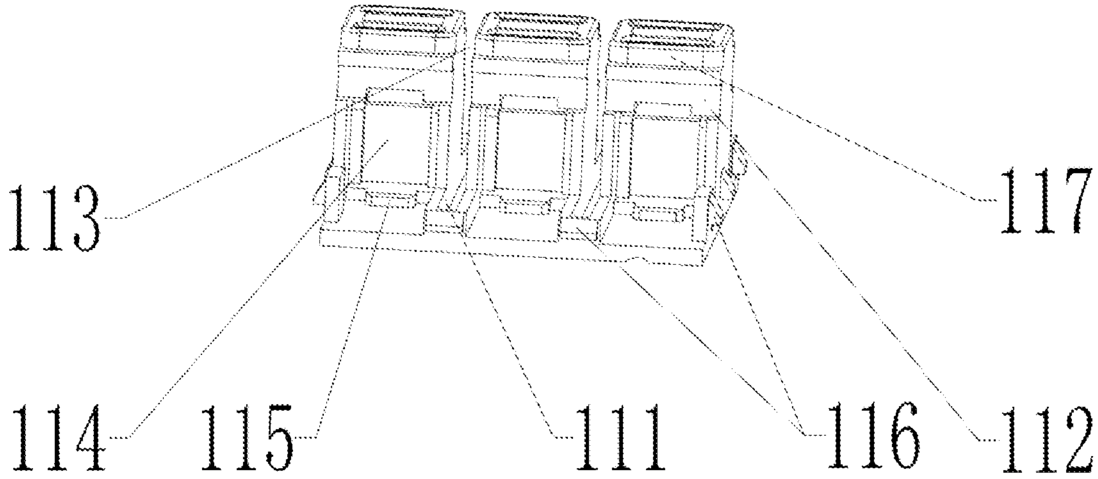
FIG. 7 is a structural schematic diagram of a base body of the connecting terminal according to one embodiment of the present disclosure.

In one embodiment, as shown in FIGS. 5-7, a plurality of the wire insertion holes 121 is defined along a width direction of the cover body 12, an outer wall segment 123 is disposed on the cover body 12 with respect to each of the plurality of the wire insertion holes 121, and each of wire insertion spaces is defined between adjacent two of the plurality of the wire insertion holes 121 through dividing portions 124, where the dividing portions 124 are disposed on the cover body 12. A plurality of the inner spaces are arranged side by side along the width direction of the cover body 12, thereby greatly increasing a number of insertion wires. The outer wall segment 123 blocks above each of the inner spaces, so that purpose of covering the elastic clamping mechanisms 2 is achieved. In addition, the dividing portions 124 divide adjacent two of the inner spaces, so that accurate guidance of the external electrical conductors in the inner spaces is achieved, and mutual contact between adjacent electrical conductors is avoided.

Furthermore, the outer wall segment 123 transversely extends from the through opening 122, along a respective one of the wire insertion holes 121, to form a free end portion for covering above the base body 11. Each of the dividing portions 124 longitudinally extends along the length direction of the cover body 12, the dividing portions 124 divide the through opening 122 into a plurality of opening portions, and the plurality of the opening portions is separated. Insertion grooves 111 are defined on the base body 11. The insertions grooves 111 are matched with the dividing portions 124, and the outer wall segment 123 and each of the dividing portions 124 are disposed at intervals. In the embodiment, a clearance fit is formed between the outer wall segment 123 and each of the dividing portions 124 or an outer side wall of the cover body 12, thereby facilitating operating members 3 (specifically referring to the following) to be accommodated therein, thereby implementing rotary opening or closing. In addition, the dividing portions 124 disposed on the cover body 12 and the insertion grooves 111 defined on the base body 11 are embedded with each other to further improve an assembly and disassembly limiting manner between the cover body 12 and the base body 11.

Furthermore, protrusions 112, capable of being respectively accommodated in the plurality of the opening portions, are disposed on the base body 11, and gaps 113, communicated with the insertion grooves 111, are oppositely disposed between the protrusions 112 at intervals. The insertion grooves 111 and the dividing portions 124 which is vertically extended are engaged and fitted with each other to achieve quick assembly and disassembly between the insertion grooves 111 and the dividing portions 124. Moreover, the gaps 113 between the protrusions 112 allows the dividing portions 124 to align into the insertion grooves 111. On the one hand, a purpose of guiding and avoiding is achieved. On the other hand, the insertion grooves 111 and the gaps 113 are divided and define the protrusions 112 regularly disposed along the width direction of the base body 11, and the protrusions 112 are configured to match with the plurality of the opening portions of the through opening 112, so as to significantly improve a degree of tight fit between the protrusions 112 and the plurality of the opening portions of the through opening 112, and further improve operability for easy implementation.

In the embodiment, groove walls of each of the insertion grooves 111 extend upwards from an end surface of the base body 11 to form a first creepage distance. An upper end of each of the dividing portions 124 extends upwards to form protruding blocks 125, and an upper end of each of the protrusions 112 extends upward to form a flange 117, so as to cooperate to form a second creepage distance. A protruding height of the protruding blocks 125 is equal to a protruding height of the flange 117, so as to maintain consistent alignment in overall appearance. Therefore, through the first creepage distance inside the housing and the second creepage distance outside the housing, a path between an insulating surface (such as the plastic housing 1) and a conductive part (such as the elastic clamping mechanisms 2 and the external electrical conductors), and a path between the conductive part and a protective surface (such as a top end surface of the plastic housing 1) are increased. In different use cases, even if the insulating surface and the protective surface are electrically polarized by the surrounding conductive part to be electrically charged, damage to users may still be effectively avoided, and security performance of the connecting terminal is greatly improved.

Figure 8:
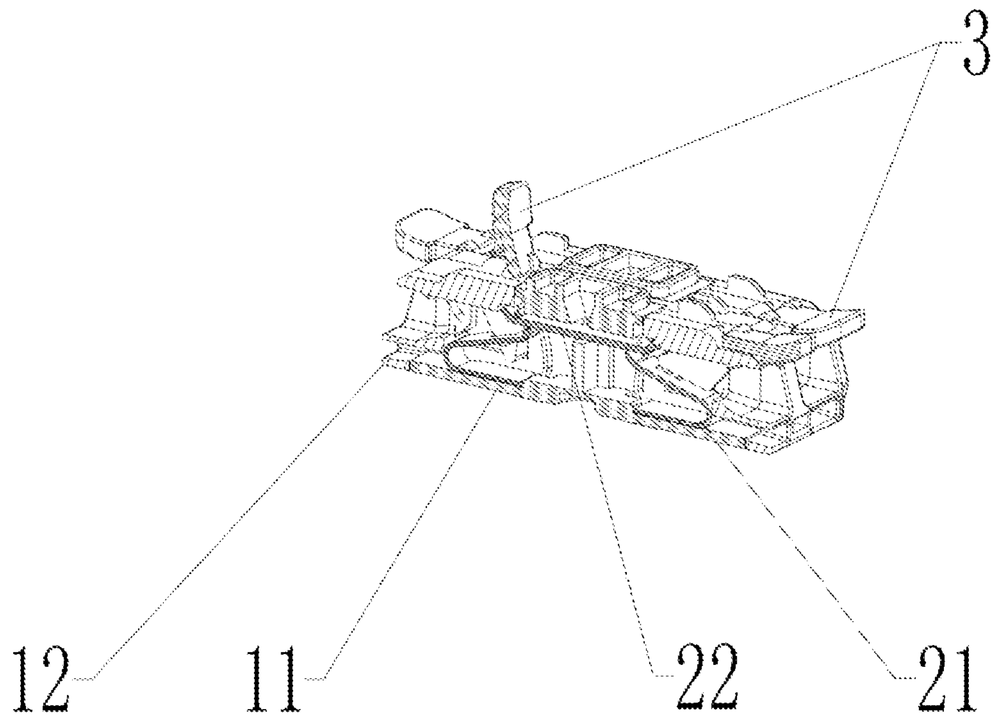
FIG. 8 is a first cross-sectional schematic diagram of the connecting terminal according to one embodiment of the present disclosure.
Figure 9:
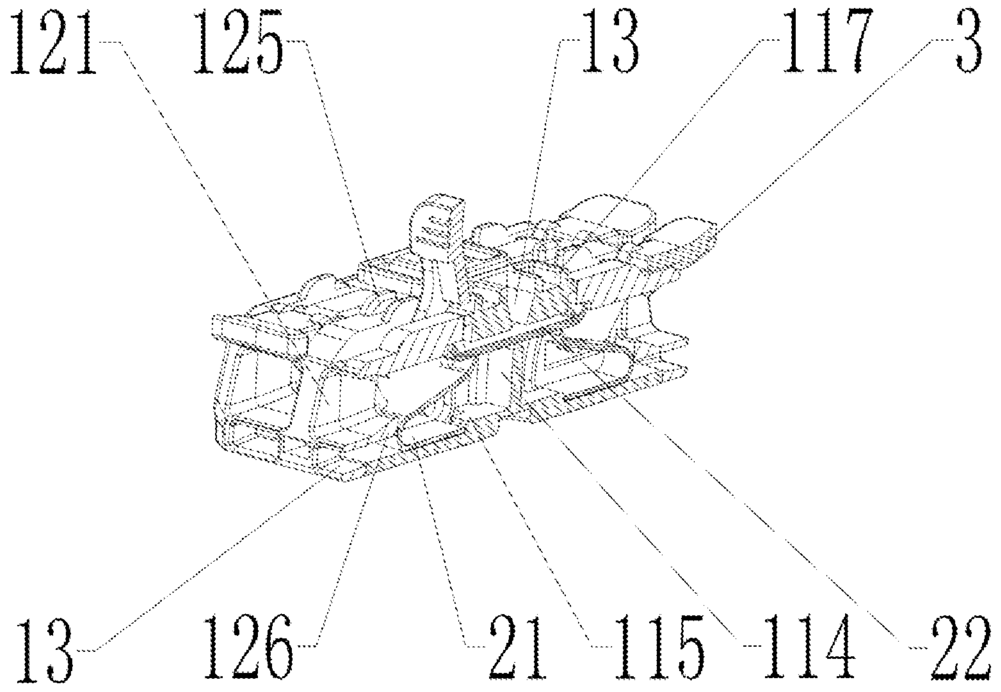
FIG. 9 is a second cross-sectional schematic diagram of the connecting terminal according to one embodiment of the present disclosure.

As shown in FIGS. 8-9, in the embodiment, the connecting terminal further includes operating members 3. The operating members 3 are rotatably disposed on the cover body 12 for respectively opening clamping structures of the elastic clamping mechanisms 2 to supply external electrical conductor clamping operation. In addition, after the operating members 3 are rotated and opened, the operating members 3 may be clamped against one side of the base body 11, thereby maintaining consistency of each of the operating members 3 after opening and closing. Apparently, the operating members 3 are specifically rotatably supported in the plastic housing 1, so as to trigger the elastic clamping mechanisms 2 during an opening and closing process, and two lever arm segments of each of the operating members 3 are movably disposed on two sides of the outer wall segment 123. After each of the operating members 3 is in a closed state, the two lever arm segments of each of the operating members 3 cooperate with the outer wall segment 123 to at least partially cover a respective one of the elastic clamping mechanisms 2. It should be understood that specific configuration manners of the operating members 3 on the plastic housing 1 and linkage manners between the operating members 3 and the elastic clamping mechanisms 2 may refer to the prior art, and details are not described herein.

Each of the elastic clamping mechanisms 2 includes spring clips 21 and a busbar 22. The busbar 22 is disposed on the base body 11, the spring clips 21 are disposed in a respective one of the inner spaces between the base body 11 and the cover body 12, and the spring clips 21 and the busbar 22 cooperate to form a respective one of the clamping structures for clamping. The busbar 22 is disposed in the respective one of the inner spaces, the busbar 22 is detachably and transversely disposed in a middle of the base body 11 and extends to be exposed outside, two ends of the busbar 22 respectively extend to be in contact with the spring clips 21, and the spring clips 21 are disposed in each of the wire insertion spaces between opposite two of the wire insertion holes 121. Therefore, a length direction of each of the protrusions 112 is provided with one busbar 22 and two spring clips 21 which are oppositely disposed, thereby implementing electrical connection to the external electrical conductors inserted into the wire insertion holes 121 on the two sides.

Retaining walls 114 are disposed on the base body 11, each of the retaining walls 114 is configured to divide the respective one of the inner spaces into separate two of the wire insertion spaces. A first assembly space for inserting the busbar 22 is defined above each of the retaining walls 114. A lower portion of each of the retaining walls 114 is integrally disposed on the end surface of the base body 11. Clamping portions 115 are disposed on one side of the end surface of the base body 11, where the one side of the end surface of the base body 11 is connected to each of the retaining walls 114. Abutting portions 126, with respect to the clamping portions 115, are disposed on an inner side of the cover body 12. Each of the clamping portions 115 and each of the abutting portions 126 together define a second assembly space for the spring clips 21. The insertion spaces associated with the two insertion holes 121 in the length direction of the cover body 12 are separated from each other through each of the retaining walls, thereby avoiding risks such as short circuit caused by direct contact between the external electrical conductors. Moreover, through the outer wall segment 123, the dividing portions 124, and the retaining walls 114, the spring clips 21 and the busbar 22 are disposed in a respective one of the inner spaces tending to be sealed, so that sealing performance and safety reliability of the connecting terminal are improved.

It should be noted that a plurality of snap-fit structures 116 is disposed along an outer peripheral side of the base body 11, butt joint structures are disposed on an inner side of the cover body 12 with respect to the plurality of the snap-fit structures 116. The butt joint structures are snap-fitted with the plurality of the snap-fit structures 116. Therefore, effective snap-fit between the cover body 12 and the base body 11 is further improved, and assembly and disassembly are facilitated. Apparently, the snap-fit structures 116 and the butt joint structures may be structures in forms of buckles and slots, and the plurality of the snap-fit structures 116 on one side of the base body 11 are not limited to a buckle structure or a slot structure.

In addition, as shown in FIG. 9, first detection ports 13 are disposed below the plurality of the wire insertion holes 121 and second detection ports 13 are above the protrusions 112, the first detection ports 13 and the second detection ports 13 are configured to communicate with the inner spaces, the first detection ports 13 are configured to perform electrical detection on the clamping clips 21, and the second detection ports 13 are configured to perform electrical detection on the busbar 22.

Furthermore, the connecting terminal includes a track configured to fix on an electric cabinet, and the connecting terminal may be directly inserted into an external panel to be used quickly through the track. Specifically, the track is detachably disposed on a bottom end surface of the plastic housing, and two ends of the track are connected to two end sides of the cover body 12 in a snap-fit manner, so as to achieve a quick assembly and disassembly therebetween.

The foregoing descriptions are merely preferred embodiments of the present disclosure, the protection scope of the present disclosure is not limited to the foregoing embodiments, and the technical solutions under the idea of the present disclosure all fall within the protection scope of the present disclosure.

What is claimed is:

1. A connecting terminal, comprising:

a plastic housing; and elastic clamping mechanisms;

wherein the elastic clamping mechanisms are disposed on the plastic housing; the plastic housing comprises a base body and a cover body; the base body penetrates out of the cover body after being matched with the cover body in up-and-down plug-in connection and at least partially exposed on the cover body, and the base body is matched with the cover body to form inner spaces for the elastic clamping mechanisms; wire insertion holes are oppositely defined on two opposite sides of the cover body in a length direction of the cover body; the wire insertion holes are respectively configured to insert external electric conductors into the inner spaces to be in contact with the elastic clamping mechanisms, so as to electrically connect at least two of the external electrical conductors wherein a plurality of snap-fit structures is disposed along an outer peripheral side of the base body, butt joint structures are disposed on an inner side of the cover body with respect to the plurality of the snap-fit structures; and the butt joint structures are snap-fitted with the plurality of the snap-fit structures.

2. The connecting terminal according to claim 1, wherein the base body is configured as a boss structure, where the boss structure is low in both sides and high in a middle; the cover body is configured as a box-shaped structure having a through opening; and the through opening is configured to match the boss structure with the box-shaped structure in the up-and-down plug-in connection.

3. The connecting terminal according to claim 2, wherein the through opening is centrally defined on the cover body along an up-and-down direction; after the base body is matched with the cover body and partially penetrates through the cover body, a top of the boss structure is flush with a top of the box-shaped structure, a bottom of the boss structure is flush with a bottom of the box-shaped structure, so as to integrally form the boss structure and the box-shaped structure from an appearance.

4. The connecting terminal according to claim 2, wherein a plurality of the wire insertion holes is defined along a width direction of the cover body, an outer wall segment is disposed on the cover body with respect to each of the plurality of the wire insertion holes, and each of wire insertion spaces is defined between adjacent two of the plurality of the wire insertion holes through dividing portions, where the dividing portions are disposed on the cover body.

5. The connecting terminal according to claim 4, wherein the outer wall segment transversely extends from the through opening, along a respective one of the wire insertion holes, to form a free end portion for covering above the base body; each of the dividing portions longitudinally extends along the length direction of the cover body, the dividing portions divide the through opening into a plurality of opening portions, and the plurality of the opening portions is separated; insertion grooves are defined on the base body; the insertions grooves are matched with the dividing portions; and the outer wall segment and each of the dividing portions are disposed at intervals.

6. The connecting terminal according to claim 5, wherein protrusions, capable of being respectively accommodated in the plurality of the opening portions, are disposed on the base body; gaps, communicated with the insertion grooves, are oppositely disposed between the protrusions at intervals.

7. The connecting terminal according to claim 5, wherein groove walls of each of the insertion grooves extend upwards from an end surface of the base body to form a first creepage distance; an upper end of each of the dividing portions extends upwards to form protruding blocks, and an upper end of each of the protrusions extends upward to form a flange, so as to cooperate to form a second creepage distance; and a protruding height of the protruding blocks is equal to a protruding height of the flange.

8. The connecting terminal according to claim 1, wherein the connecting terminal further comprises operating members; the operating members are rotatably disposed on the cover body for respectively opening clamping structures of the elastic clamping mechanisms to supply external electrical conductor clamping operation;

each of the elastic clamping mechanisms comprises spring clips and a busbar; the busbar is disposed on the base body, the spring clips are disposed in a respective one of the inner spaces between the base body and the cover body, and the spring clips and the busbar cooperate to form a respective one of the clamping structures for clamping; and the busbar is disposed in the respective one of the inner spaces, the busbar is detachably and transversely disposed in a middle of the base body and extends to be exposed outside, two ends of the busbar respectively extend to be in contact with the spring clips, and the spring clips are disposed in each of the wire insertion spaces between opposite two of the wire insertion holes.

9. The connecting terminal according to claim 8, wherein retaining walls are disposed on the base body, each of the retaining walls is configured to divide the respective one of the inner spaces into separate two of the wire insertion spaces; a first assembly space for inserting the busbar is defined above each of the retaining walls; and a lower portion of each of the retaining walls is integrally disposed on the end surface of the base body; and clamping portions are disposed on one side of the end surface of the base body, where the one side of the end surface of the base body is connected to each of the retaining walls; abutting portions, with respect to the clamping portions, are disposed on an inner side of the cover body; and each of the clamping portions and each of the abutting portions together define a second assembly space for the spring clips.

10. A connecting terminal, comprising:

a plastic housing; and elastic clamping mechanisms;

wherein the elastic clamping mechanisms are disposed on the plastic housing; the plastic housing comprises a base body and a cover body; the base body penetrates out of the cover body after being matched with the cover body in up-and-down plug-in connection and at least partially exposed on the cover body, and the base body is matched with the cover body to form inner spaces for the elastic clamping mechanisms; wire insertion holes are oppositely defined on two opposite sides of the cover body in a length direction of the cover body; the wire insertion holes are respectively configured to insert external electric conductors into the inner spaces to be in contact with the elastic clamping mechanisms, so as to electrically connect at least two of the external electrical conductors;

wherein the base body is configured as a boss structure, where the boss structure is low in both sides and high in a middle; the cover body is configured as a box-shaped structure having a through opening; and the through opening is configured to match the boss structure with the box-shaped structure in the up-and-down plug-in connection;

wherein a plurality of the wire insertion holes is defined along a width direction of the cover body, an outer wall segment is disposed on the cover body with respect to each of the plurality of the wire insertion holes, and each of wire insertion spaces is defined between adjacent two of the plurality of the wire insertion holes through dividing portions, where the dividing portions are disposed on the cover body;

wherein the outer wall segment transversely extends from the through opening, along a respective one of the wire insertion holes, to form a free end portion for covering above the base body; each of the dividing portions longitudinally extends along the length direction of the cover body, the dividing portions divide the through opening into a plurality of opening portions, and the plurality of the opening portions is separated; insertion grooves are defined on the base body; the insertions grooves are matched with the dividing portions; and the outer wall segment and each of the dividing portions are disposed at intervals.

* * * * *